United States Patent [19]

Gjessing et al.

[11] Patent Number: 5,534,868
[45] Date of Patent: Jul. 9, 1996

[54] METHOD AND SYSTEM FOR THE DETECTION AND MEASUREMENT OF AIR PHENOMENA AND TRANSMITTER AND RECEIVER FOR USE IN THE SYSTEM

[75] Inventors: Dag K. Gjessing, Skedsmokorset; Jens F. Hjelmstad, Lillestrøm, both of Norway

[73] Assignee: Susar A/S, Oslo, Norway

[21] Appl. No.: 307,688

[22] PCT Filed: Mar. 15, 1993

[86] PCT No.: PCT/NO93/00042

§ 371 Date: Sep. 23, 1994

§ 102(e) Date: Sep. 23, 1994

[87] PCT Pub. No.: WO93/19383

PCT Pub. Date: Sep. 30, 1993

[30] Foreign Application Priority Data

Mar. 26, 1992 [NO] Norway .................... 921193

[51] Int. Cl.⁶ .................................................. G01S 13/95
[52] U.S. Cl. .................................... 342/26; 342/460
[58] Field of Search ............................ 342/26, 460

[56] References Cited

U.S. PATENT DOCUMENTS

| | | | |
|---|---|---|---|
| Re. 33,152 | 1/1990 | Atlas .................................. | 342/26 |
| 3,251,057 | 5/1966 | Buehler et al. ..................... | 342/5 |
| 4,665,401 | 5/1987 | Garrard et al. ..................... | 342/75 |
| 5,077,558 | 12/1991 | Kuntman ............................ | 342/26 |
| 5,136,296 | 8/1992 | Roettger et al. ................... | 342/26 |
| 5,173,704 | 12/1992 | Buehler et al. .................... | 342/26 |
| 5,198,819 | 3/1993 | Susnjara ............................ | 342/26 |
| 5,241,315 | 8/1993 | Spinhirne .......................... | 342/54 |
| 5,359,330 | 10/1994 | Rubin et al. ...................... | 342/26 |
| 5,410,314 | 4/1995 | Frush et al. ....................... | 342/26 |
| 5,434,570 | 7/1995 | Wurman ............................ | 342/26 |
| 5,469,169 | 11/1995 | Frush ................................. | 342/26 |
| 5,471,211 | 11/1995 | Randall et al. .................... | 342/26 |

FOREIGN PATENT DOCUMENTS 0436048  7/1991  European Pat. Off. ........ G01S 13/95

*Primary Examiner*—John B. Sotomayor
*Attorney, Agent, or Firm*—Rothwell, Figg, Ernst & Kurz

[57] ABSTRACT

A system and method for the detection and measurement of atmospheric air movement irregularities such as wind velocity vector, clear air turbulence, aircraft induced vorteces and turbulence, by means of electromagnetic waves. An air volume (10) under investigation is illuminated by a transmitter (1, 1A, 1B) with a beam of coherent electromagnetic energy (1E), and a resulting wave field (2E) is received and subsequently coherently demodulated and processed in process means to derive information on the existence of the said atmospheric irregularities and furthermore to give specific measurements of related parameters. At least one receiver (2, 2A, 2B) for said resulting wave field (2E), which is due to scattering in said air volume (10), is positioned at a bistatic location having a selected distance (2R) from said transmitter (1, 1A, 1B). Said electromagnetic energy (1E) is transmitted at microwave frequencies in a concentrated beam. Transmitter and receiver antennas (1A, 1B, 2A, 2B), respectively, are directed so as to cover said air volume (10) with a scattering angle (Θ) chosen to have such a (low) value that scattering from atmospheric irregularities in said air volume (10) has a higher power than noise sources in the system.

15 Claims, 10 Drawing Sheets

| COMMUNICATION CIRCUIT PARAMETER | RELATION BETWEEN CIRCUIT PARAMETER AND RADIOMET PARAMETER |
|---|---|
| WIDTH OF DELAY SPECTRUM | $\Delta\gamma = \dfrac{d^3}{8a^2 c}(e^{2/n}-1)$ |
| BANDWIDTH | $\Delta\omega = \dfrac{8a^2 c}{d^3}(e^{4/n}-1)$ |
| GAIN LOSS | $G_L = \dfrac{5Ad^2}{\lambda a^2}(2^{1/n}-1)(4^{1/n}-1)^{1/2}$ |
| HORIZONTAL FIELDSTRENGTH CORRELATION DISTANCE | $L_H = \dfrac{0.44\,\lambda a}{d(4^{1/n}-1)^{1/2}}$ |
| VERTICAL FIELDSTRENGTH CORRELATION DISTANCE | $L_V = \dfrac{0.44\,\lambda}{d(2^{1/n}-1)}$ |
| WAVELENGTH | $\dfrac{P(\lambda_1)}{P(\lambda_2)} = \left(\dfrac{\lambda_1}{\lambda_2}\right)^{n-1}$ |

FIG.3

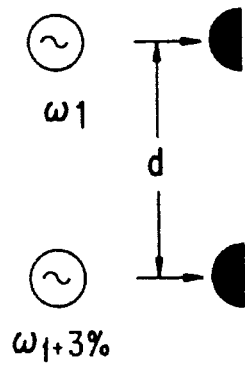
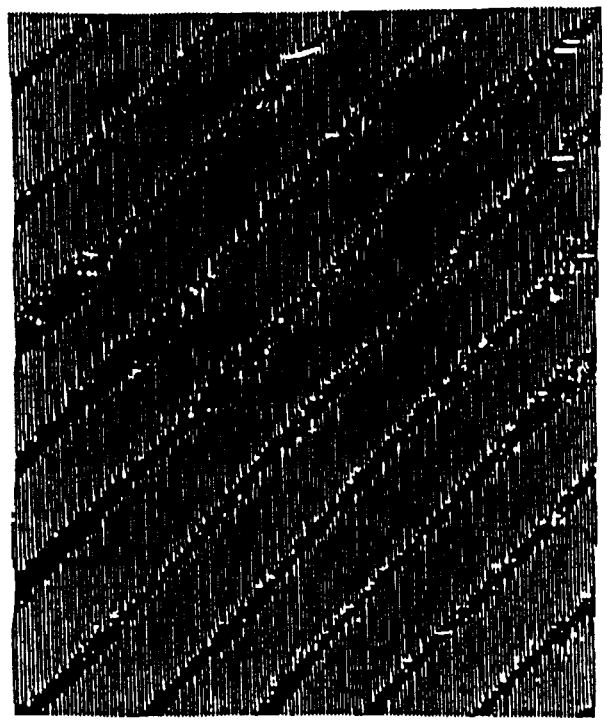
FIG.5
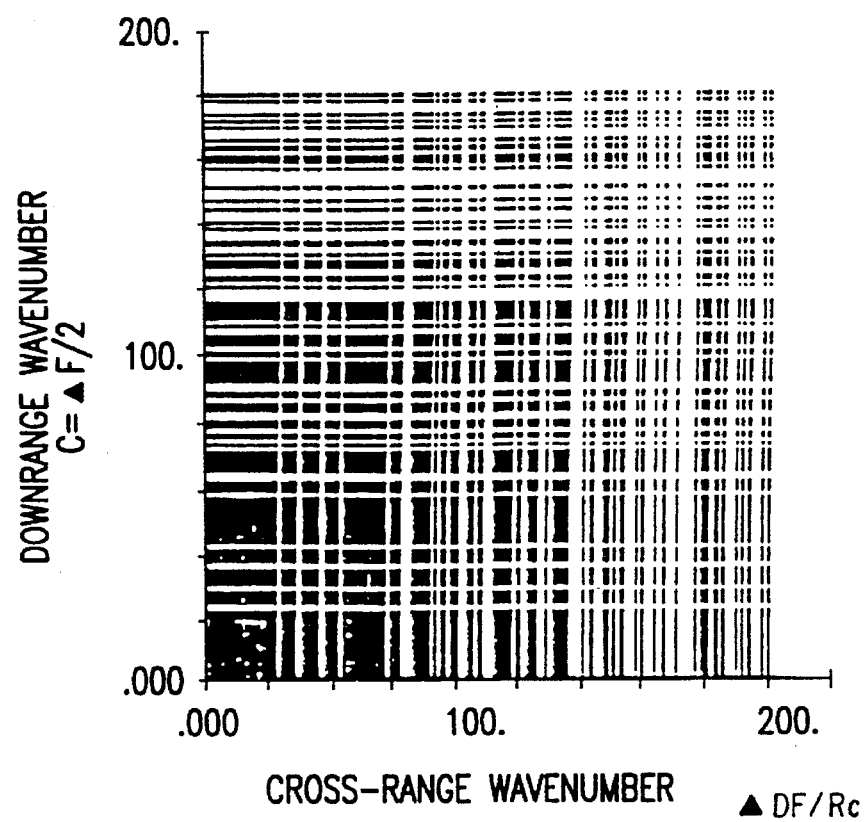
FIG.8

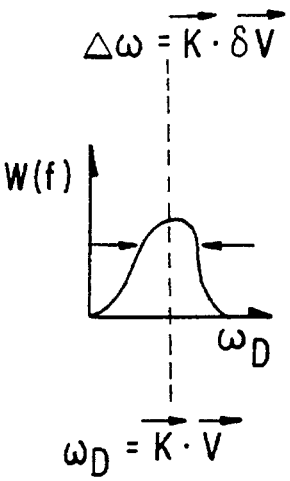
FIG.11C
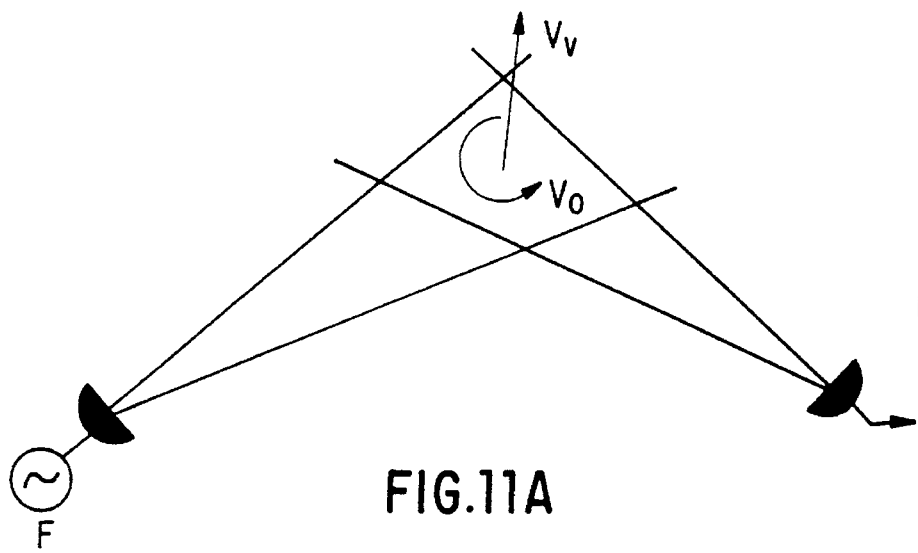
FIG.11A
| VORTEX | CAT |
|---|---|
| $V_O$ = 20 M/sec | $V_O$ = 2 M/sec |
| VORTEX DIAMETER ≈ 30 M | DOMINANT SCALE |
| $f_D = \frac{1}{2\pi} \vec{k} \cdot \vec{v}$ | $L = \frac{2\pi}{K} = H = 400 \, M$ |
| AT SCALE $L = \frac{2\pi}{K} = 30 \, M$ | $\delta f = \frac{1}{2\pi} \vec{k} \cdot \vec{\delta v}$ |
| $\delta f = \frac{1}{2\pi} \vec{k} \cdot \vec{\delta v}$ | $= \frac{1}{2\pi} \frac{2\pi}{400 \, M} \cdot 2 \, M/sec$ |
| $= \frac{1}{2\pi} \frac{2\pi}{30 \, M} \cdot 20 \, M/sec$ | |
| $\delta f = 0.6 \, Hz$ | $\delta f = 0.005 \, Hz$ |
FIG.11B

METHOD AND SYSTEM FOR THE DETECTION AND MEASUREMENT OF AIR PHENOMENA AND TRANSMITTER AND RECEIVER FOR USE IN THE SYSTEM

BACKGROUND OF THE INVENTION

This invention relates to a system for the detection and measurement of velocity, turbulence, vorteces and similar irregularities or phenomena in air, including classification of such phenomena. These may comprise the wind velocity vector, clear air turbulence as well as aircraft induced vorteces and turbulence. Detection and measurement as contemplated here takes place by means of electromagnetic waves.

The invention also comprises transmitter and receiver equipment for use in the system, as well as an associated method.

The invention is primarily directed to radar-based technology for the measurement of wind, wind shear, aircraft wave vorteces and turbulence affecting air traffic safety. Thus, a simple and inexpensive bistatic radar is described theoretically and with practical examples.

In general various and different fields of use of this invention will be possible, such as for meteorological purposes.

A general background of interest in this connection can be found in the following publications:

REFERENCES

1) Gjessing, Dag T, (1962): Determination of permittivity variations in the troposphere by scatter-propagation methods. IEE Monograph No 510E, April.
2) Gjessing, Dag T, (1969): Atmospheric structure deduced from forward-scatter wave propagation experiments. Radio Science, Vol 4, No 12, pp 1195–1201, December.
3) Gjessing, Dag T, Anton G. Kjelaas and J. Nordø, (1969): Spectral measurements and atmospheric stability. J of the Atmospheric Sciences, Vol 26, February.
4) Gjessing, Dag T, (1986): Target adaptive matched illumination RADAR: Principles & applications. Peter Peregrinus Ltd, London.
5) Gjessing, Dag T and Jens Hjelmstad, (1989): Artificial Perception of objects and scattering surfaces based on electromagnetic waves. Target Adaptive Matched illumination radar (TAMIR). Radar 1989.

Reference to publications listed above will be made in the following description, More particularly reference is made at this point to published European patent application No. 436,048A1, which is directed to a method and system for measuring atmospheric wind fields, i.e. to problems related to those with which the present invention is concerned. Thus, according to EP 436,048A1 an air volume under investigation is illuminated by a transmitter with a beam of coherent electromagnetic energy and a resulting, i.e. reflected wave field is received and subsequently coherently demodulated and processed to derive information on the atmospheric phenomena of interest.

It is to be noted that the known method and system just referred to, is based on resulting waves due to coherent back-scattering (reflection) of transmitted VHF or UHF frequencies, which means that desired performance with respect to accuracy, resolution, flexibility and degrees of freedom in available functions and measurements, is not attained.

SUMMARY OF THE INVENTION

Substantial improvements in these and other respects are obtained in the system according to the present invention, which basically uses microwave frequencies and measures coherent forward scatter waves. The novel and specific features according to this invention are set out more completely in the claims.

BRIEF DESCRIPTION OF THE DRAWINGS

The invention as well as resulting advantages will be explained more in detail in the following description, referring also to the drawings in which:

FIG. 3 is a table of relationships characterizing the scattering from wind-shear phenomena, FIG. 5 illustrates an interference pattern resulting from transmission of two closely spaced frequencies from two different apertures, FIG. 6 schematically shows an interferometric radar system with two apertures, FIG. 8 is a diagram showing as an example the effect of using 16 antennas and 16 frequencies in a common, monostatic radar system, FIG. 11 illustrates an example of Doppler broadening.

DESCRIPTION OF THE PREFERRED EMBODIMENTS

Introduction, Presentation of Problem, General Philosophy and Measuring System.

Remote measurement of the wind field within a limited volume on the glidepath within which the wind field has major impact on the aircraft, is the primary topic of this description. Several weather conditions are of importance.

In this connection emphasis will be placed on four conditions.

a) Little or no wind in the lowest part of the boundary layer monitored by in situ ground based instruments. Strong wind above certain height. The two atmospheric layers may also have marked differences in temperature.

b) Local areas of strong down-and/or updrafts resulting from lee-wave occurrences or local convective plume phenomena.

c) Strong anisotropic turbulence characterized as $$\left(\frac{\overline{\Delta v}}{v}\right)^2 K^{-n}.$$

d) Small scale aircraft wake vortex.

It is the objective of this description to present a simple inexpensive system that will constitute a diagnostic tool based on remote assessments of air dynamics. The underlying philosophy in regard to such a measuring system is the following:

Although the ideal system probably will consist of a single radar covering a large geographical area capable of giving the wind vectors in a large 3-directional space, the air safety requirements may well be satisfied with a simple dedicated system which by remote sensing methods gives information about a set of parameters that is strongly related to, or is a direct consequence of, a given wind field adverse to air safety.

A multi-sensor-data-fusion system with a maximum of orthogonality (maximum degrees of freedom) should be employed. Learning with time, the system redundancy can be reduced thus reducing system cost.

Potential Remote Sensed Parameters Describing Aircraft Wake Vortex, Wind Shear, Down Draft and Turbulence Conditions.

When discussing such parameters pragmatically, the fundamentals of the observational system should first be closely defined. (See FIG. 1 to be explained below).

Secondly, one shall need a clear understanding regarding the prevailing atmospheric conditions. Since the degrees to which these conditions affect air traffic safety is dramatically different, it is important to design a system with a sufficient number of degrees of freedom so as to be able to make the appropriate classification of windshear phenomena and other athmospheric irregularities.

Specifically, if the measurements are limited to measuring scattered power and Doppler shift which is the case with most radar concepts, the false alarm rate is expected to be considerable.

As an example, a bird flying at a given speed through the scattering volume may well give rise to a scattered power and a Doppler shift which is similar to that caused by an aircraft wake vortex.

Figure 1:
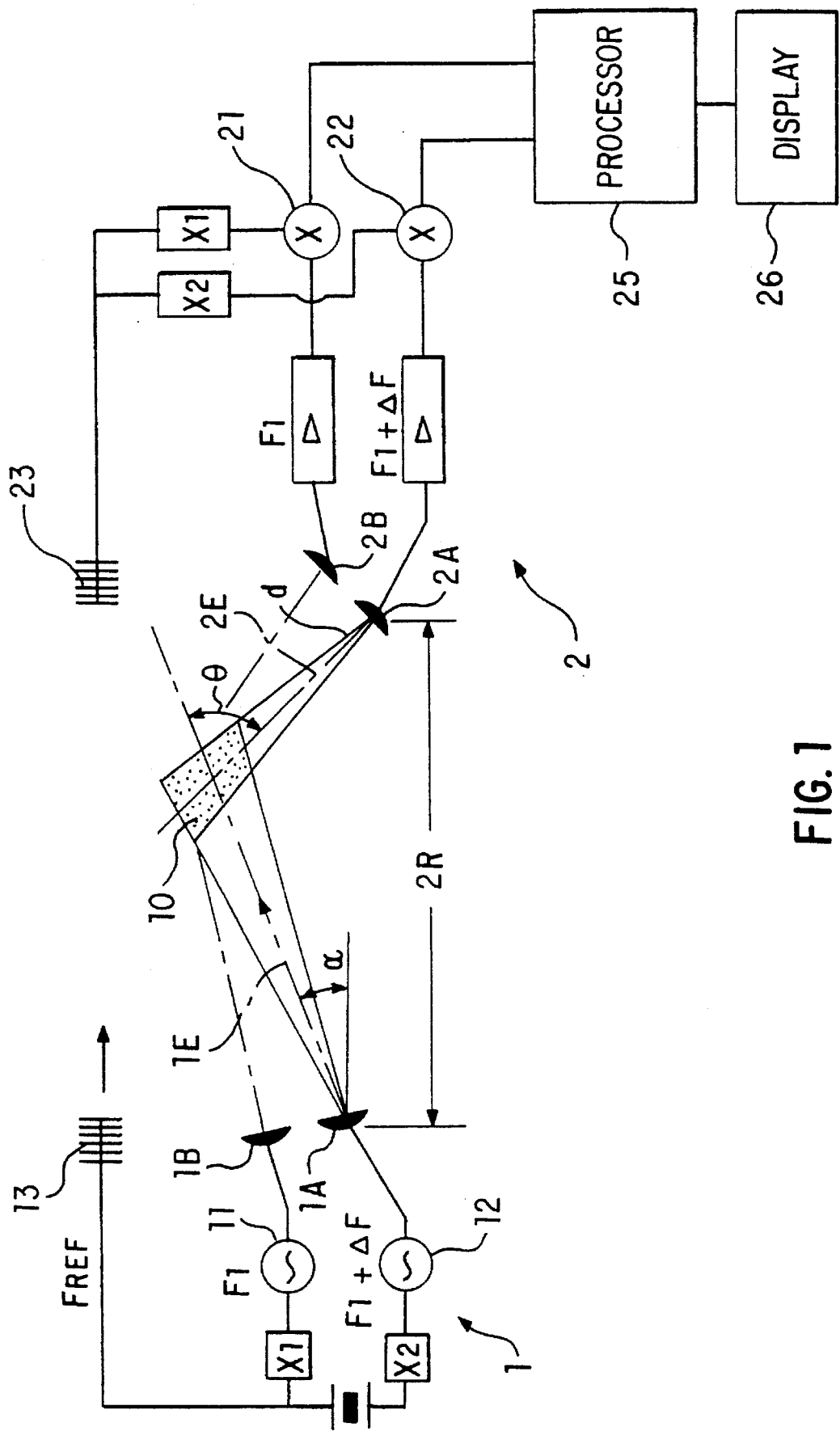
FIG. 1 schematically illustrates the overall system according to the invention, with exemplary embodiments of transmitter and receiver arrangements.

The basic principles of the system according to the present invention shall now be described with reference to FIG. 1, showing the general architecture of the signal analysis and pattern recognition in the system. A transmitter generally denoted 1 with an antenna or antennas 1A and 1B cooperates with a receiver generally denoted 2 having an antenna or antennas 2A. Thus, two or more antennas (apertures) can be provided at the transmitter 1 and/or the receiver 2. As indicated there is a certain distance 2R between the transmitter antenna 1A and the receiver antenna 2A. From antenna 1A there is shown a beam of coherent electromagnetic energy, the axis of which is denoted 1E. Correspondingly, receiver antenna 2A is adapted to receive a wave field as indicated at 2E, i.e. within a certain angle in space around the central axis indicated from antenna 2A. Accordingly, scattering of the transmitted electromagnetic energy 1E from the common air volume indicated at 10, results in the received wave field 2E, which makes it possible to investigate atmospheric air movement phenomena occurring in the common air volume 10.

Thus, the system illustrated in FIG. 1 utilizes the forward scattering mechanism and in this connection it is essential that the scattering angle θ is chosen to have such a low value that scattering from homogeneous isotropic turbulence in air volume 10 has a higher power than noise sources in the system. The scattering angle θ of course is related to the distance 2R separating the transmitter antenna 1A and the receiver antenna 2A, as well as the elevation of the central axes 1E and 2E respectively of these antennas. In the case of detection or measurement relating to the glidepath for aircraft in connection with a runway, the arrangement of antennas 1A and 2A with their beams 1E and 2E respectively, is usually oriented transversally to the longitudinal direction of the glidepath. Moreover, in practice and on the basis of suitable microwave frequencies employed, the scattering angle θ preferably is chosen to be smaller than 20°.

Typical specifications in the embodiment illustrated in FIG. 1 are as follows:

| | |
|---|---|
| Distance | $2R = 7$ km |
| Transmitter power | $P_T = 5$ WATTS |
| Frequency | $F = 10$ GHz ($\lambda = 3$ cm) |
| Antenna aperture | $d = 100$ cm |
| Transmitter antenna elevation | $\alpha = 2°$ |

As indicated in FIG. 1, transmitter 1 comprises two transmitter circuits generally denoted 11 and 12 respectively, for frequences F1 and F1+ΔF. The receiver 2 has corresponding receiver channels comprising coherent homodyne demodulater circuits 21 and 22 respectively. For this demodulation, a reference frequency $F_{REF}$ is transmitted by means of a separate channel or path in which antennas 13 and 23 are incorporated. As will be understood the required reference frequency can be provided by other means than illustrated as an example in FIG. 1. A preferred solution comprises local oscillators adapted to be locked to a common reference, such as a GPS satellite.

Thus, according to the above, it is preferred in the system of the invention to employ a transmitter for two or more coherently related microwave frequences. Moreover; as will be understood by persons skilled in the art, it is an advantage that the transmitter and/or receiver antennas 1A and 2A are arranged to radiate a minimum of electromagnetic power in the direction of the other antenna, thus avoiding undue disturbance or masking of the forward scatter signal which is of interest. In order to cover an increased air volume or space the receiver and/or transmitter antennas 1A and 2A should preferably be adapted to be steered mechanically or electronically. This will make it possible to obtain a two or three dimensional map of atmospheric phenomena of interest, in particular windshear features.

Processor means or unit 25 shown in FIG. 1 in practice will be in the form of a computer with necessary programs for performing functions, processing signals and implementing algorithms to be described further below, examples of which are Delta-K-processing, algorithms for inversion, classification, generating images and windshear alerts. In this connection FFT processing and Kahan filtering are usually within the capabilities of processor unit 25. Block 26 is a display or data link unit.

As indicated in FIG. 1 the wind assessment system is based on a highly sensitive coherent bistatic radar system retaining the transmitting frequency on the receiver site by direct transmission of a reference signal $R_{REF}$ or by the use of stable reference oscillators at both ends.

This coherent system makes it possible to measure amplitude and phase (Doppler broadening and Doppler shift) at the receiver.

Thus, an important feature according to the invention consists therein that the coherent homodyne demodulators 21 and 22 give a Doppler shift in the plane through the transmitter and receiver antennas 1A and 2A and the scattering air volume 10.

In order for the instantaneous bandwidth to be measured as a function of time, many frequencies are employed, as indicated with $F_1$ and $(F_1+\Delta F)$ in FIG. 1.

At the receiver 2, amplitude and phase are measured at all these frequences and the complex voltages thus obtained are multiplied (correlated), this being one of the functions performed by processor unit 25.

The degree of correlation $R(\Delta F)$ is, as explained further below, a direct measure of bandwidth which in turn determines the slope n of the refractive index spectrum $\Phi(K) \sim K^{-n}$.

Similarly, by making use of spaced receiving antennas the spatial correlation properties of the scattered field can be measured. From this, important information regarding the dynamics of the air can be obtained.

Various aspects of this invention as briefly set out above, as well as other aspects, will be further explained in the following description.

Four important classes of air motion being of most interest in this connection, are as follows:

| AIRCRAFT WAKE VORTEX | CLEAR AIR TURBULENCE (CAT) | WIND SHEAR | DOWN DRAFT |
|---|---|---|---|

The measurable parameters in relation to these four classes, are:

TRANSMISSION LOSS (SCATTERING CROSS SECTION)
BANDWIDTH OF TRANSMISSION PATH
DOPPLER SPECTRUM (MOTION PATTERN)
SPATIAL CORRELATION OF SCATTERED FIELD
FREQUENCY DEPENDENCE
REFRACTION (BENDING OF RAY)

Thus, according to the principles of this invention, four different air dynamic classes can be characterized by 6 radio circuit parameters or signature domains. These relationships will now briefly be sketched with reference to earlier contributions according to references 1-5 listed above.

Atmospheric Structure Deduced from Forward Scatter Wave Propagation.

This topic has been subjected to detailed considerations with emphasis on communications applications as early as twenty to thirty years ago.

This invention is in part based on the result of these early considerations for air safety application. First, consider the turbulence spectrum $\Phi(K) \sim K^{-n}$. The spectrum parameter n characterizes the distribution of "eddy size".

Turbulence spectrum $\Phi(\vec{K})$:

It is well established through similar considerations that the 3-dimensional velocity spectrum is of the same form as that of the refraction index irregularity spectrum. We write this on the form $\Phi(K) \sim K^{-n}$ where $n=5/3$ is a good estimate for high values of K in a well mixed isotropic atmosphere. Close to the ground along the glidepath, strong degrees of anisotropy and gradients of wind temperature and velocity has an effect on the turbulence parameter n. Furthermore, the large scale eddies are governed by the nearness of the ground leading to a cut-off of the spectrum at wavenumbers $$K = \frac{2\pi}{H}$$

where H is the height (e.g. glidepath) above ground.

Figure 2B:
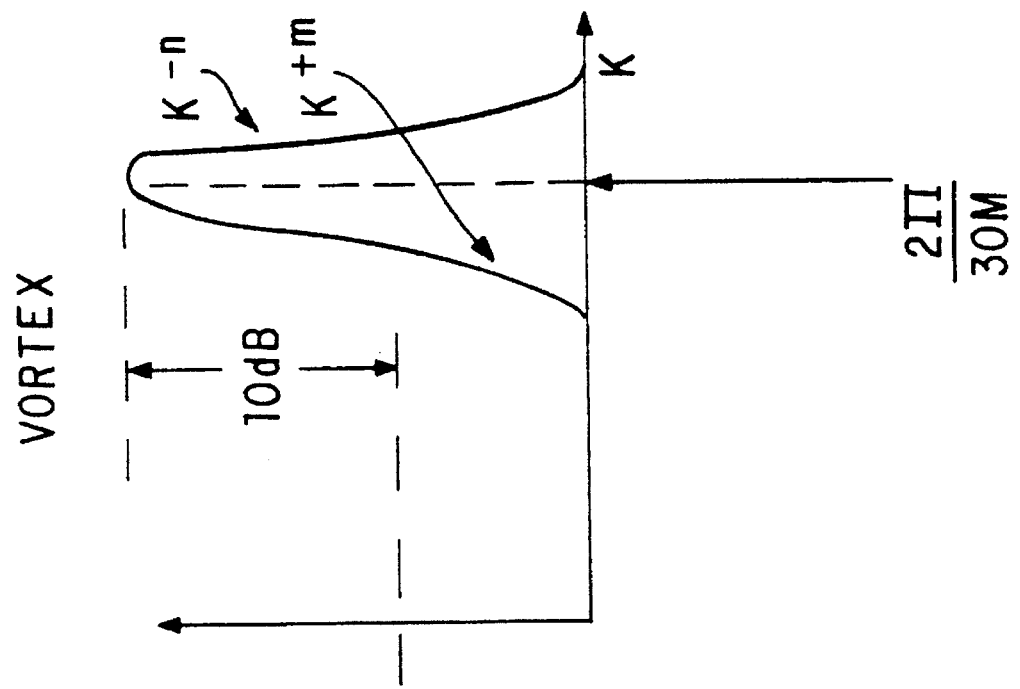
FIG. 2 shows examples of wavenumber spectra of interest in connection with wind-shear phenomena.
Figure 2A:
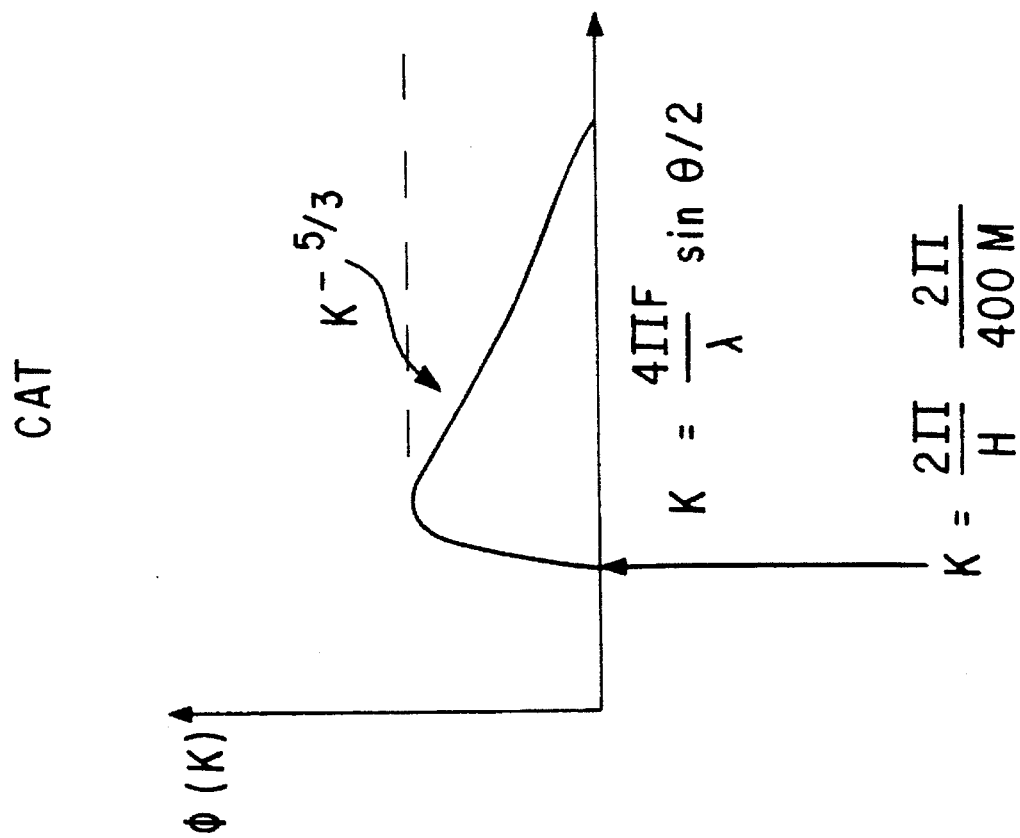

FIG. 2 illustrates this with a sketch of a vortex spectrum and a CAT spectrum included for comparison. A clear difference is seen between the resonant character of the vortex spectrum and the characteristic slope ($K^{-5/3}$) of the CAT spectrum. It is seen that in addition to measuring the scattered power, the shape of the refrative index spectrum contributes to the assessment of air motion severity. Thus, the spatial wavenumber spectrum of refractive index is goverened by many dynamic factors. The measurable quantities in the table of FIG. 3 all contribute to an assessment of the turbulence parameter n, FIG. 3 showing some relationships characterizing the propagation medium for an over-the-horizon remote sensing circuit.

Figure 4:
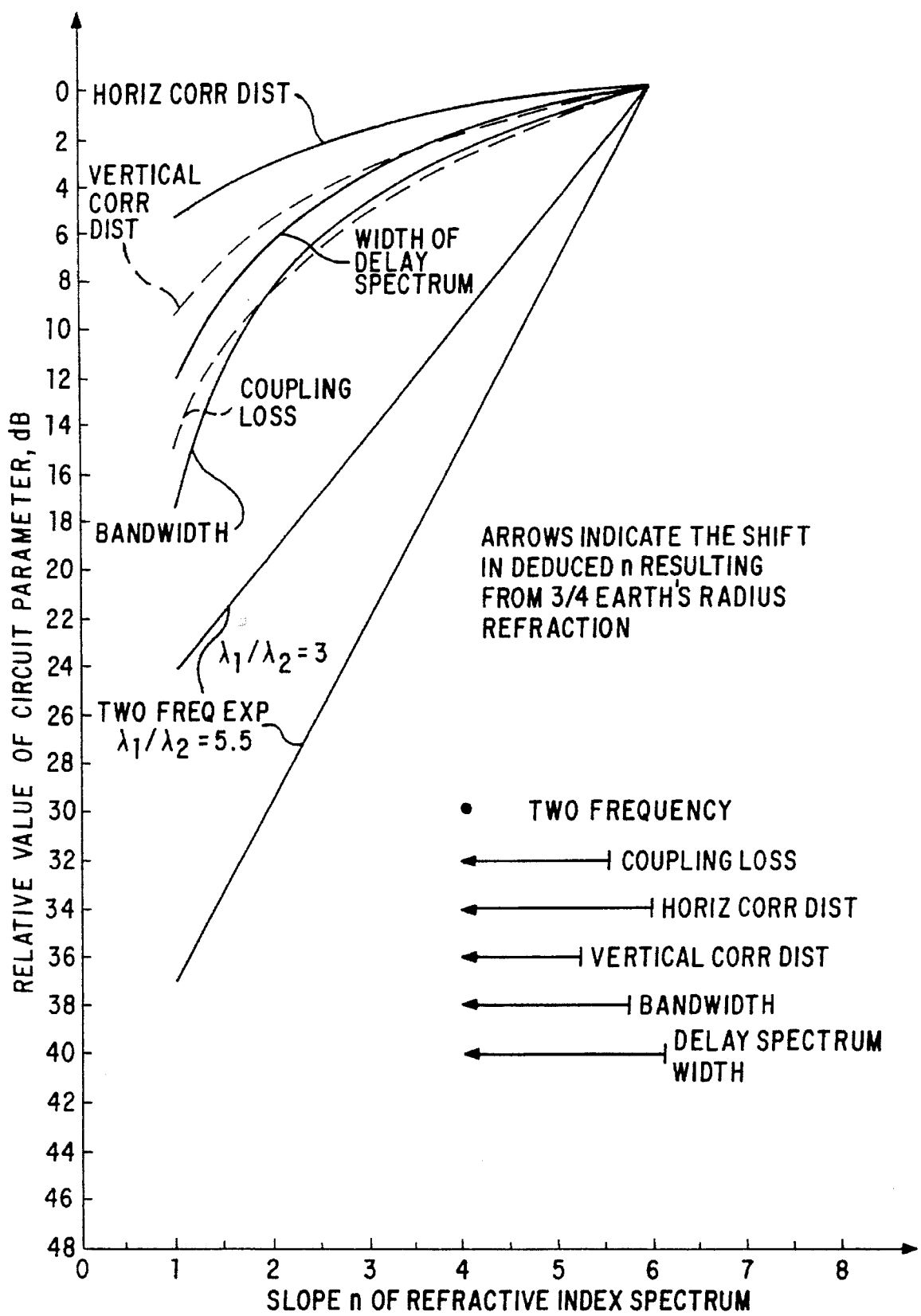
FIG. 4 is a diagram with curves illustrating the theoretical relationship between the measured quantity and the slope of the refractive-index spectrum.

FIG. 4 illustrates the table of FIG. 3, i.e. the theoretical relationship between the measured quantity and the slope n of the refractive-index spectrum $$(\Phi(K) \sim K^{-n})$$

The curves show the degree to which the spectrum slope affects the measured quantity. Length of the arrows shows the effect of refraction on the n deductions; in other words to what extent the various measurable radio quantities contribute to an assessment of the turbulence parameter n and to the refraction parameter a.

We see, as an example, that measuring the circuit bandwidth gives us information about the turbulence parameter. Consequently focus is placed on this bandwidth parameter since this represents an inexpensive and simple method.

With reference to this simple equation relating the turbulence spectrum slope n to the measurable quantity $\Delta\omega$ (and to FIG. 4), it is clear that this bandwidth parameter is a well pronounced descriptor for the turbulence parameter n.

The turbulence parameter (slope of spectrum) can be deduced from the measurement of bandwidth, as will be seen from the following relationships regarding bandwidth $\Delta\omega$ (see also FIG. 1).

$$\Delta\omega = \frac{8c}{2R\theta^2} (10^{2/m} - 1)^{-1}$$

m=SPECTRUM SLOPE ($\pi \sim \Phi(K) \sim K^{-m}$
c=WAVE VELOCITY ($3\times10^8$ M/sek.)
2R=DISTANCE between transmitter and receiver
$\theta$=SCATTERING ANGLE Furthermore, with reference to FIG. 2 there is a dramatic difference between the $K^{-n}$ turbulence spectra to be expected from CAT, respectively aircraft vortex.

The wavenumber corresponding to the horizontal gradient (max $\Phi(K)$) for wind produced turbulence is in the order of $2\pi/400$ (at 400 m height) whereas that for aircraft vortex is larger by an order of magnitude.

In order to couple to the appropriate turbulence scale K, we can control the following parameters:

Scattering angle $\theta$
Carrier frequency F
Beat frequency $\Delta F$ by measuring (E(K) and E(K+$\Delta$K)) and compute the covariance function between the two (E(K) E*(k+$\Delta$K). With this methods we couple to a scale $$\Delta L = \frac{c}{2\Delta F}$$

or to a wavenumber $$K = \frac{2\pi}{\Delta L} = \frac{2\pi\Delta F}{c}.$$

(For details regarding the $\Delta K$ method, the reader is referred to ref. 4).

As an example illustrating this, consider a forward scatter system with the following specifications.

Path length 700 m
Height of common volume 400 m
Scattering angle $$2\tan^{-1}\frac{400}{3500} = 13°$$

Carrier frequency F=10 GHz.
In order to couple to the CAT and height 400 m we require the following conditions to be fulfilled:

$$\Delta K = 2\Delta k \text{ si } \theta/2$$

$$\frac{2\pi}{400} = 2\frac{2\pi\Delta F}{c}\sin\theta/2$$

$$\Delta F = 3.4 \text{ MHz}$$

In order to obtain max coupling to the vortex structure on the other hand, we need a $$\Delta K = \frac{2\pi}{30m}$$

requiring a beat frequency
$\Delta F = 45$ MHz

Having considered the spatial turbulence spectrum characterized by the simple $\Phi(\vec{K}) \sim K^{-n}$ function where the parameter n is determined by a set of measuring techniques involving measurement of bandwidth, delay spectrum, spatial correlation etc, we shall now consider another domain, namely that of Doppler. Measurement of Air Motion by Doppler Considerations:

Up to this point we have focused the attention on 3 dimensions of the problem, namely those of space. We have measured received field as a function of frequency (wavenumber K) and deduced the spatial distribution of the scattering elements $$E(\vec{K}) \sim \int \sigma(\vec{Z})e^{j\vec{K}\cdot\vec{z}}dz$$

We shall now concentrate on the fourth dimension, namely that of time or Doppler.

The Doppler shift $\Omega_D$ which an EM wave is subjected to when scattered by scattering elements with velocity $\vec{V}$ is given by $$\omega_D(K) = \vec{K}\cdot\vec{V}$$

As already shown, the scattering process selects spatial irregularities of scale L or wavenumber $$K = \frac{2\pi}{L}$$

given by $$\vec{K} = \vec{k}_i - \vec{k}_s$$

where $\vec{k}_i$ is the wavenumber of the incident wave and $\vec{k}_s$ the corresponding one for the scattered wave.

Similarly, using a spatial interference pattern obtained by the use of several frequencies from one or more antennas we have $$\omega_D(\Delta K) = \Delta\vec{K}\cdot\vec{V}$$

Hence, in order to measure the angular distribution of the wind field (3 D motion of the scattering elements), we shall have to vary the direction of the wavenumber $\Delta\vec{K}$ so as to measure the vector velocity $\vec{V}$. Consider now a bistatic system arranged transversally to the glidepath, where the beams are oriented in elevation and azimuth such that the scattering plane contains the glidepath. Hence the vector $$\vec{K} = \vec{k}_i - \vec{k}_s$$

should be parallel to the glidepath.

Using now two transmitting antennas spaced d meter apart with different frequencies, an interference pattern in the plane of the antennas will result as illustrated in FIG. 5. According to this example, when two closely spaced frequencies (3% spacing) are transmitted into the spatial volume, an interference pattern results. The direction of $\Delta\vec{K}$ and its magnitude is dependent on $\omega$, $\Delta\omega$, d and position R,$\theta$ in space.

The Doppler shift caused by air motion is maximum when the wind is normal to the interference line ($\vec{V}$ parallel to $\vec{K}$), and obviously zero when parallel to the interference lines.

Figure 6:
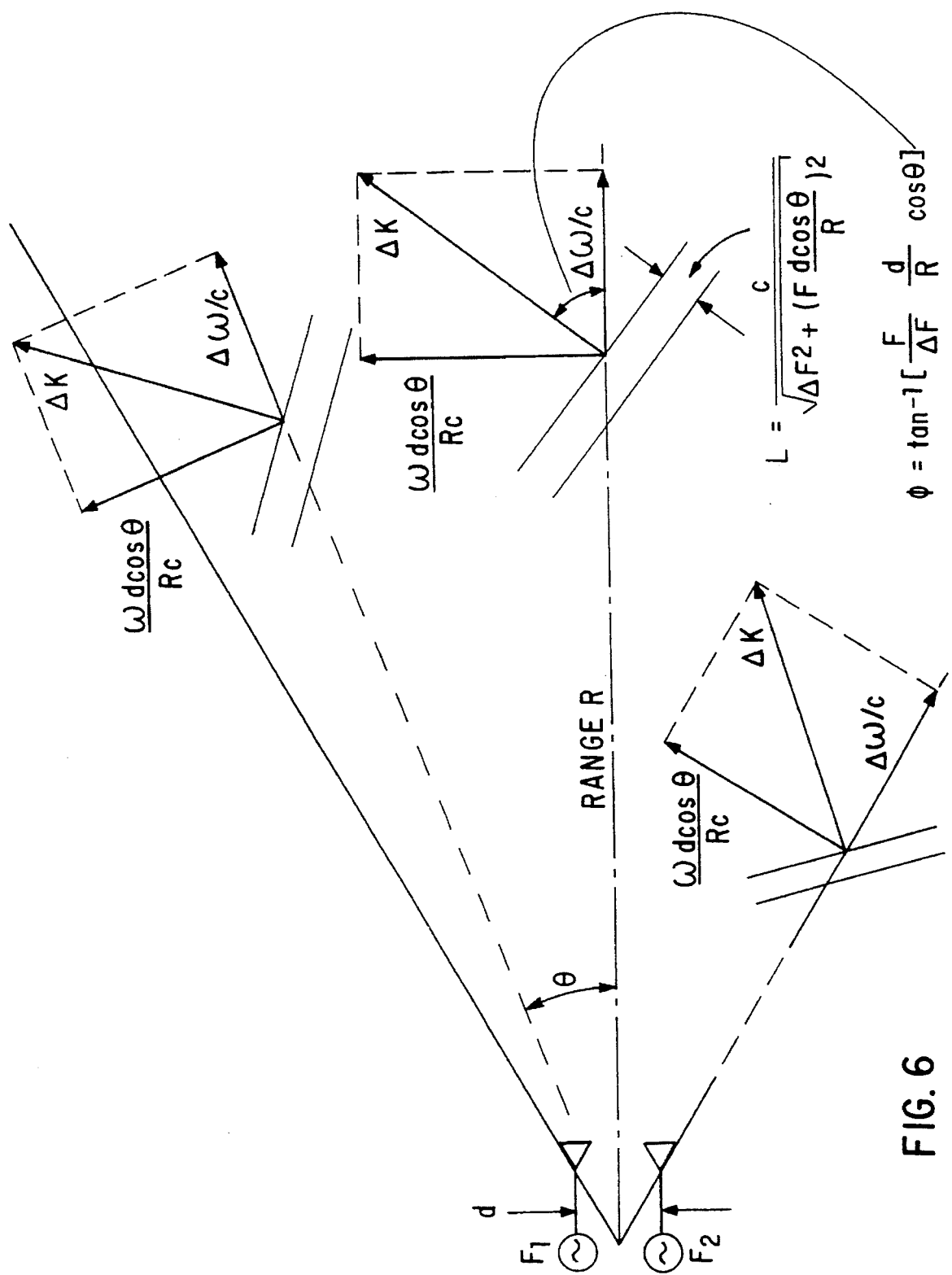

Changing the spacing d between the antennas or between the frequencies $\Delta\omega$, has the same effect, as illustrated in FIG. 6. Thus, use is made of an interferometric radar system ($\Delta K$ system) with two apertures spaced distance d apart and having a frequency difference $\Delta F$, a $\Delta\vec{K}$ pattern with different orientation and spacing can be generated.

It can be shown (as inferred from FIG. 6) that the direction of the interference wavenumber $\vec{K}$ is given by $$\phi = dir\Delta\vec{K} = \tan^{-1}\left(\frac{F}{\Delta F}\frac{d}{R}\right)$$

whereas the magnitude of $\Delta K$ (inverse of spacing between interference lines) is $$\Delta K = \frac{2\pi}{L} = \frac{\left(\Delta F^2 + \left(\frac{Fd}{R}\right)^2\right)^{1/2}}{2\pi c}$$

(this applies for narrow beams such that the scattering takes place close to the center line where $\phi$ is small, see FIG. 6).

Consider as an example that we wish to measure the wind vector $\vec{V}$ in the glidepath plane. We make use of two antennas spaced d and two frequencies spaced $\Delta F$ so as to produce two sets of $\Delta\vec{K}$ lines. One set is tilted 45° in the other direction.

Hence $$\phi = 45° = \tan^{-1}\left(\frac{F}{\Delta F}\frac{d}{R}\right)$$

$$\therefore \frac{F}{\Delta F} = \frac{R}{d}$$

Under such conditions the spacing L between the interference lines (two sets of 90° difference in orientation) becomes $$L = \frac{2\pi}{\Delta K} = \frac{c}{\left(\frac{Fd}{R}\right)\sqrt{2}}$$

Hence, for a wind in the direction of $\Delta\vec{K}_1$, the Doppler shift becomes $$f_D(\Delta K) = \frac{1}{2\pi} \Delta\vec{K} \cdot \vec{V}$$

$$f_D(\Delta K) = \sqrt{2} \ \frac{Fd}{cR} V$$

whereas the other orthogonal $\Delta K$ channel will give zero.

In this context advantages are obtained according to the invention, in that the receiver has several receiving apertures and comprises a coherent homodyne demodulator that gives a directional Doppler shift in a plane orthogonal to the plane through the transmitter and receiver antennas and the scattering air volume. When two or more coherently related microwave frequencies are transmitted, the receiver preferably has a separate receiving aperture for each transmitted frequency and a signal processor for multiplying a homodyned signal at each aperture and frequency to generate a time series having a spectrum which gives the directional Doppler shift in any plane through the scattering air volume.

Concluding this section on Doppler with the beam geometry in the glidepath plane we note that the particular $\Delta\vec{K}$ system allows one to measure the wind velocity distribution in the plane of the glidepath. If there is a wind shear this leads to several Doppler lines the strength of which are determined by the relative size of the air strata of different speed, and by the refractivity variance within the strata.

Up to this point we have constrained the discussion to the consideration of turbulence spectrum $\Phi(\vec{K})$ and motion pattern $P(\omega)$ within a spatial region (air volume under investigation) governed by the beam geometry, namely that illuminated by the transmitting beam and "seen" by the receiver. Through such considerations we analyze an area of some 100 m deep and 1000 m wide for a pathlength of 7 km. If the beam geometry is confined to a vertical plane, this means that the height interval covered around the glidepath is ±50 m whereas the width with the glidepath as the centerline is ±500 m.

If spatial resolution in excess of this is a requirement, we shall need a number of frequencies which is determined by resolution in range and by the size of the common volume and we shall need a number of antennas which is determined by the cross range resolution required and by the cross range size of common volume. This topic is covered in the following description referring to FIGS. 7, 8 and 9.

Resolution in Space, Imaging Capability.

A Brief Summary of the Basic Foundation

Figure 7:
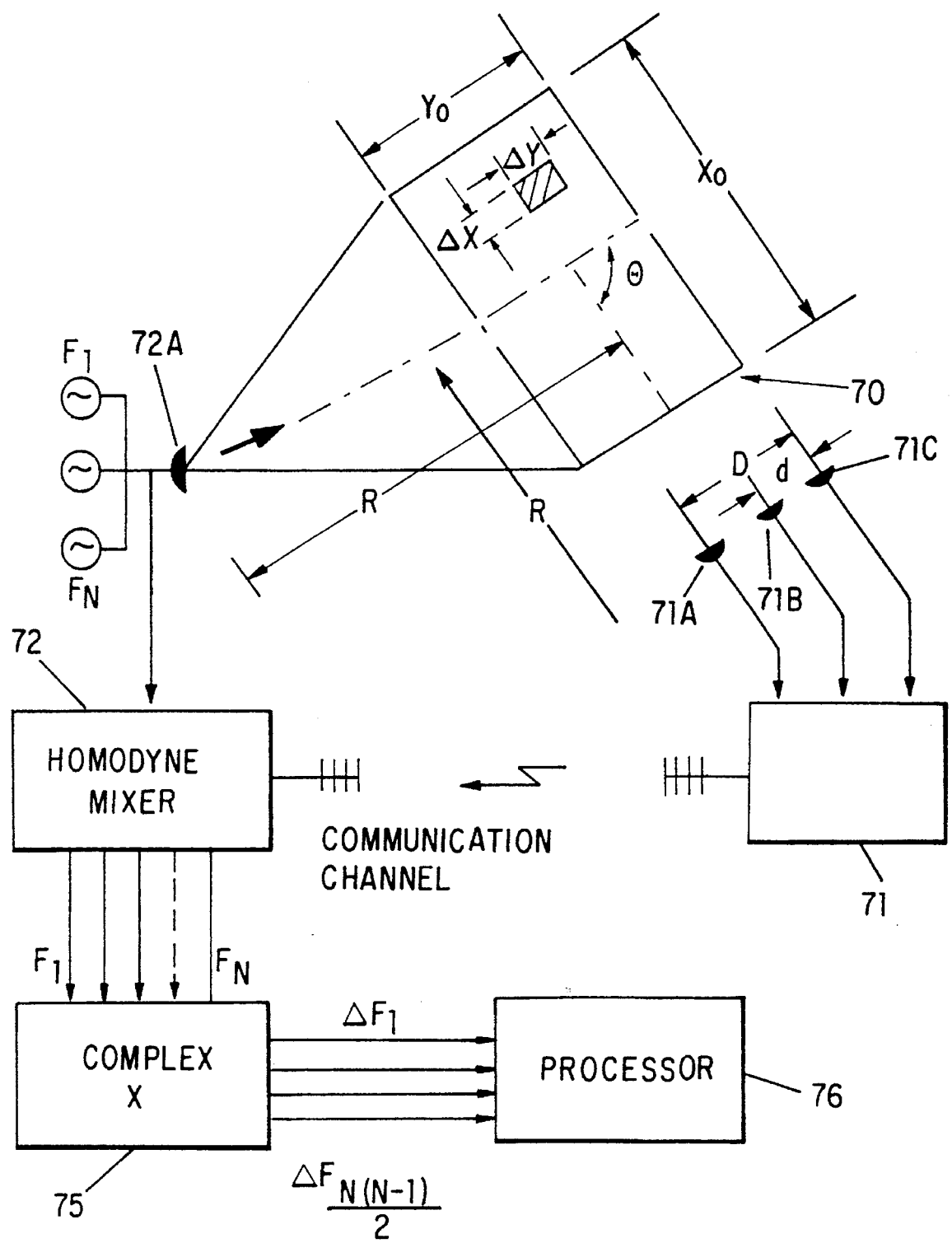
FIG. 7 is a schematic illustration of the general multifrequency bistatic radar system according to the invention, with indications of relevant variables in the system.

Reference is first made to FIG. 7 showing the general multifrequency bistatic radar system according to this invention, with indications of magnitudes and variables to be discussed below. In the principle FIG. 7 corresponds to FIG. 1.

Main blocks and functions illustrated in FIG. 7 are transmitter 71, receiver represented by homodyne mixer 72, complex multiplication 75 and processor 77, the two latter being in FIG. 1 incorporated in processor unit 25. Delta-k-processing as referred to in this description may take place in complex multiplication unit 75. How to achieve a 1- or 2-dimensional wavenumber representation of the scattering distribution in the common air volume 70, is readily apparent from FIG. 7. The third dimension is obtained by turning transmitter antennas 71A,B,C by 90°.

We homodyne (complex Complex conjugate multiplication) the received signal $V_R(\vec{K})e^{j\omega t-\vec{k}\cdot\vec{r}}$ with that transmitted $V^T(\vec{K})e^{j\omega t}$ thus obtaining $V(\vec{K})e^{-jk_1\cdot x}$.

We then multiply each of the N carrier frequencies with each other obtaining $N(N-1)/2$ $\Delta F$ channels (Delta-k-processing).

Through this complex multiplication process we get $\langle V^*(K)V(K+\Delta K)\rangle_K$ and obtain a phase angle $e^{-j\Delta\vec{k}\cdot\vec{r}}$ where $\Delta\vec{K}=\vec{K}-\vec{K}_{(N-1)}$.

The scattering scene (target or air volume 70) is then characterized in the Fourier domain as a hologram:

$$\langle V^*(\vec{K}) \ V(\vec{K}+\Delta\vec{K})\rangle_K \sim \Phi(\Delta\vec{K}) \sim \int \sigma(\vec{r})e^{-j\Delta\vec{k}\cdot\vec{r}}d\vec{r}$$

To image the scene we compute the inverse Fourier transform $$\sigma(\vec{r}) \sim \int \Phi(\Delta\vec{K})e^{j\Delta\vec{k}\cdot\vec{r}}d\Delta\vec{K}$$

The N carrier frequencies are spaced according to the Golomb ruler, and so are the receiving antennas 72A.

In order to image a scene 70 of size $X_oY_o$ down to a resolution $\Delta X\Delta Y$, the following conditions shall have to be fulfilled for backscatter:

| | |
|---|---|
| $\Delta F_{MAX} = \frac{c}{2\Delta X}$ | R = Range to scene<br>d = Distance between nearest antenna elements |
| $\Delta F_{MIN} = \frac{c}{2X_o}$ | D = Distance between extreme antenna elements |
| $D_{MIN} = \frac{cR}{F\Delta Y} = d$ | c = Wave velocity |
| $D_{MAX} = \frac{cR}{FY_o} = D$ | $\Delta F$ = Frequency difference |

Figure 9:
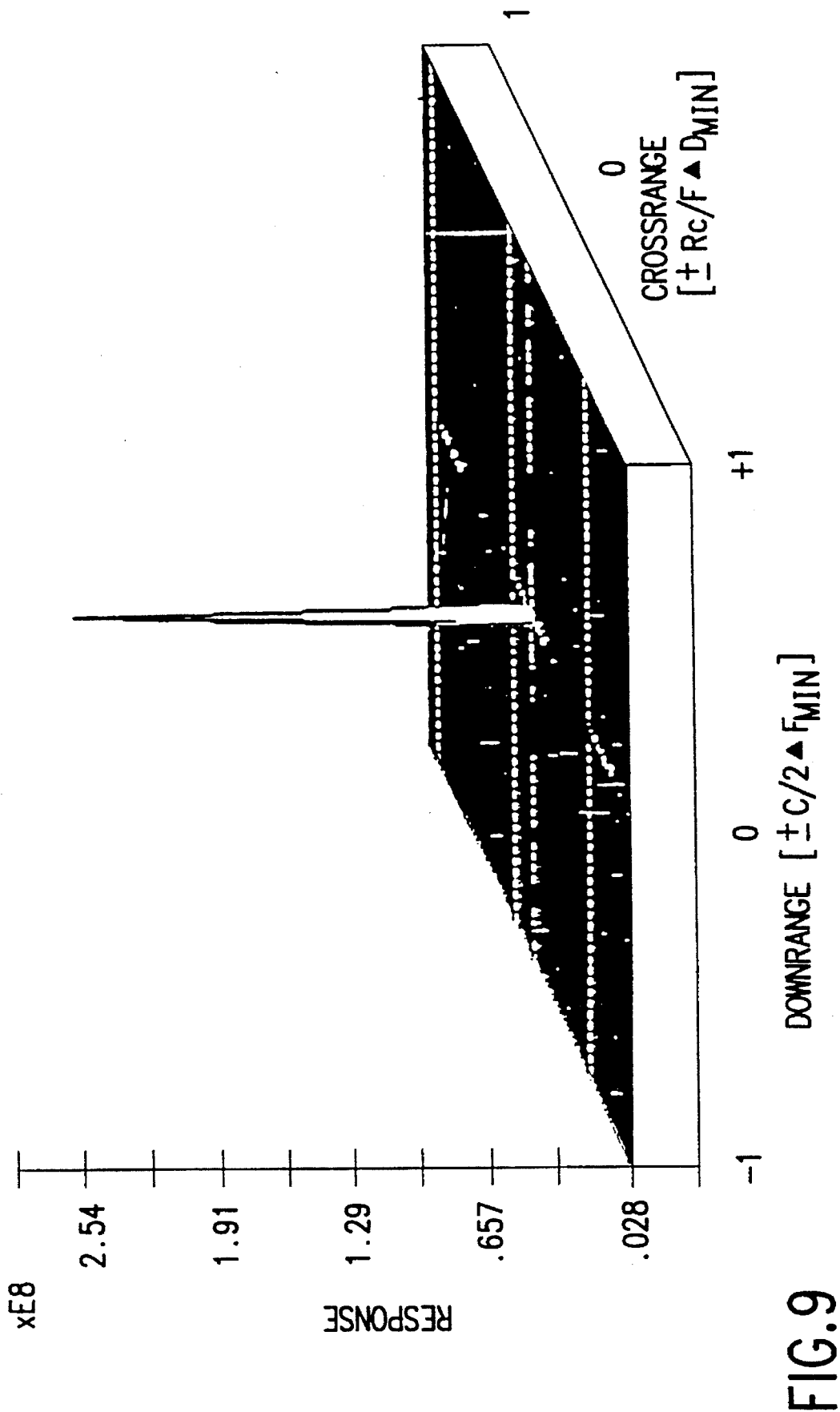
FIG. 9 shows a three-dimensional diagram related to the example of FIG. 8.

A numerical example of this monostatic 2-D imaging capability through spaced frequencies and spaced antennas is shown in FIGS. 8 and 9.

According to FIG. 8, by employing a Golomb scheme for frequency spacing as well as for antenna spacing, the number of antennas/frequencies is reduced substantially $$\left( N = \frac{n(n-1)}{2} \right).$$

In the current example use is made of 16 antennas and 16 frequencies giving a hologram (matrix) with $$\frac{16(16-1)}{2} \times \frac{16(16-1)}{2} \approx 14\ 000 \text{ elements (textels)}.$$

FIG. 9 illustrates performing a 2-D Fourier transformation of the two-dimensional $\Delta K$ spectrum (hologram), whereby the spatial window function results. The resolution in range is $$\frac{c}{2\Delta F_{MAX}}$$

whereas the range of interest with no ambiguities is $$\frac{c}{2\Delta M_{MIN}}$$

Similarly the corresponding cross range characteristic is $$\frac{D_{MAX}F}{Rc}$$

and $$\frac{D_{MIN}F}{Rc}$$

To get some feeling for the general dimensions involved with spaced frequencies and spaced antennas, let us present an example.

Consider a scene in the air:

| Size of scene | |
|---|---|
| Cross range dimension | 1000 m |
| Dimensions in range | 4000 m |
| Resolution required | |
| Cross range | 100 m |
| Range resolution | 100 m |
| Range to scene | 5000 m |
| Frequency | F = 10 GHz |

$$\Delta F_{MAX} = \frac{c}{c\Delta Z} = 1.5 \text{ MHz}$$

$$\Delta F_{MIN} = \frac{c}{2Z_o} = 37 \text{ kHz}$$

$$D_{MAX} = \frac{cR}{F\Delta X} = 1.5 \text{ m}$$

$$D_{MIN} = \frac{cR}{FX_o} = 15 \text{ m}$$

With forward scattering $\Delta X$ and $X_o$ should be multiplied with $\sin \theta/2$ and the Y component should be multiplied by $\cos^2 \theta/2$ where $\theta$ is the scattering angle.

The number of frequencies required is $$N_F = \sqrt{2\frac{X_o}{\Delta X}} = 9$$

The number of antenna elements required is $$N_D = \sqrt{2\frac{Y_o}{\Delta Y}} = 5$$

The motion pattern is obtained through a Fourier transformation process in time $$\Phi(\Delta K, \omega) \sim \int \sigma(\vec{r}, t) e^{-j\omega t} dt.$$

Hence we obtain a Doppler frequency $\omega$ associated with each point in the 2-D Fourier space (each textel) as $$\omega_D = \Delta \vec{K} \cdot \vec{v}$$

In order to obtain the velocity pattern in physical space, i.e. velocity vector for a pixel, a sequence of conditional operations shall have to be performed involving changing $\Delta K$ in a systematic fashion so as to map the motion field in relation to the image structure. This requires sequential introduction of Doppler filters so as to resolve the ambiguities.

Characterization of Air Motion ( CAT, Wind Shear, Down Draft and Aircraft Wake Vortex) Based on Matched Illumination Concepts, an Example.

Let us, in the form of an example specify a set of conditions which one can meet when flying down the glidepath. It is the purpose of this endeavour to form the basis of an assessment of the general technique in regard to distinguish between the various air dynamics factors affecting air safety.

| CAT | WAKE VORTEX | WIND SHEAR | DOWN DRAFT |
|---|---|---|---|
| $K^{-n}$ turbulence | Max (K) for $D = \frac{2\pi}{30 \text{ m}}$ | 10 m/sec front wind over 1200 ft | 1 m/sec up on glidepath 4 nm before runway |
| Cut off at $K = \frac{2\pi}{H}$ | | 10 m/sec tail wind below | |
| Turbulent velocity 2 m/sec | Orbital velocity 30 m/sec Height of phenomenon 1200 feet | | 10 m/sec down 3 nm before runway |

Distinction Based on Measurement of the Turbulence Spectrum $\Phi(K) \sim K^{-n}$ Through Measuremet of Bandwidth:

We illuminate the common volume in a bistatic arrangement with the scattering plane containing the glidepath such that $\vec{K} = \vec{K}_i \vec{K}_s$ is parallel to glidepath.

We space the frequencies $F_i$ to $F_N$ in such a way so as to obtain $$\frac{N(N-1)}{2}$$

different frequency spacings $\Delta F$ according to the Golob ruler.

As an example we use 6 values of F around 10 GHz so as to obtain 15 different frequency spacings ranging from 0.5 MHz to 6 MHz.

Based on the specification set given above, we can compute the $\Phi(\Delta K)$ spectrum (bandwidth and center frequency) by calculating $$\Phi(\Delta K) \sim E(K) E^*(\vec{K} + \Delta \vec{K})$$

If we express the turbulence spectrum on the form $$\Phi(K) \sim P(K) \sim K^{-n}$$

and the bandwidth $\delta K$ that determined by a 10 dB reduction in power, we have the following relationship:

$$\frac{P(K_o + \delta K)}{P(K_o)} = \left(1 + \frac{\delta K}{K_o}\right)^{-n}$$

$$\frac{1}{10} = \left(1 + \frac{\delta K}{K_o}\right)^{-n}$$

$$\delta K = K_o (10^{\frac{1}{n}} - 1)$$

$$\delta F = \frac{c \delta K}{2\pi} = F_o (10^{\frac{1}{n}} - 1)$$

Figure 10B:
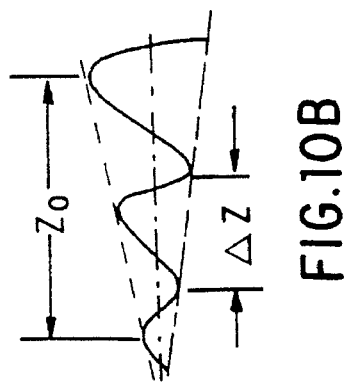
FIG. 10 is a diagram of turbulence spectra.
Figure 10A:
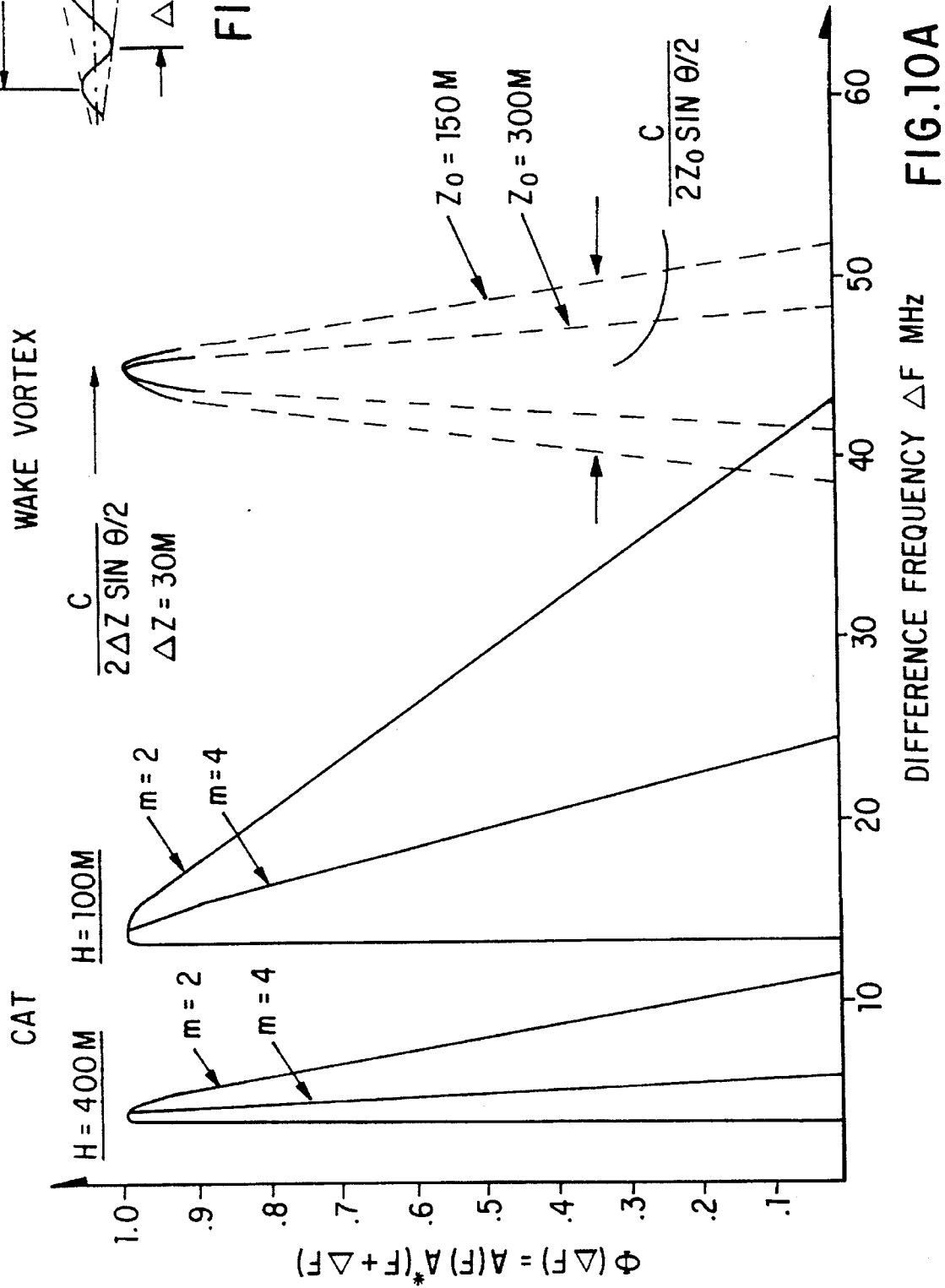

Reference is made to FIG. 10 showing an approximate assessment of the turbulence $\Delta K$ spectrum for respectively clear air turbulence at height 400 m and 100 m, respectively, and also for the spatially exponentially damped wake vortex.

In FIG. 10 the turbulence spectra $\Phi(K)$ are plotted for various values of n and height of glidepath H. For comparison, with normalized amplitude, the corresponding spectrum is plotted for the wake vortex assuming that the vortex phenomenon with eddy size 30 m is damped to 1/e over a distance of 300 m respectively 150 m.

Note that there is a dramatic difference between the normalized CAT signature and that of the wake vortex.

In practice there is also expected to be a 10 dB difference in spectral intensity between the two phenomena in that vortex is up by 10 dB relative to CAT. This concludes the discussion on turbulence spectra $\Phi(\Delta \vec{K})$.

Measurement of Doppler:

The Doppler shift $f_D$ is given by $$f_d = \frac{1}{2\pi} \Delta \vec{K} \cdot \vec{V}$$

whereas the Doppler broadening is $$\Delta f = \frac{1}{2\pi} \Delta \vec{K} \cdot \vec{V}$$

Coupling to the CAT at height 400 m we need a wavenumber $$\vec{K} = \vec{k}_i - \vec{k}_s = \frac{2\pi}{400}.$$

If the velocity variance is 2 m this leads to a Doppler broadening of $5 \times 10^{-3}$ Hz whereas the vortex at wavenumber $$\frac{2\pi}{30m}$$

and an orbital velocity of 20 m/sec gives a dramatically higher Doppler broadening of $6 \times 10^{-1}$ Hz. This is illustrated in FIG. 11 (Motion Pattern Doppler). The marked difference in scale size between the vortex and CAT phenomena (30 m and 400, respectively) coupled to the difference in orbital motion leads to a dramatic difference in Doppler broadening.

Finally, confining the discussion to Doppler consideration, let us consider the case with wind shear.

To couple to the air motion at height H a frequency $\Delta F$ given by $$\Delta F = \frac{c}{2H \sin\theta/2}$$

should be used.

If the wind at height H moves with a velocity V along the direction of the glidepath, the Doppler shift of the carrier frequency F will be $$f_D(K) = \frac{1}{2\pi} \vec{K} \cdot \vec{V}$$

or $$f_D(K) = \frac{2FV}{c} \sin\chi/2$$

whereas the corresponding Doppler shift of the beat frequency is $$f_D(\Delta F) = \frac{2\Delta FV}{c} \sin\theta/2$$

With the assumed wind shear of 10 m/s front wind above 1200 FT and 10 m/sec tail wind below this leads to Doppler shifts of $$f_D(K) = 73 \text{ Hz}$$

whereas the $\Delta K$ Doppler shift is $$f_D(\Delta K) = 0.02 \text{ Hz}$$

In order to optimize the S/N ratio, the two F channels should be subjected to narrow filters prior to the V(F) V,(F+$\Delta$F) multiplication. After the multiplication this multiplied signal should be subjected to further filtering and integration.

Through this process, the S/N ratio is enhanced by the factor $$\frac{F}{\Delta F}$$

It is to be noted at this point that two frequency channels and/or two antennas or apertures represent embodiments being within the scope of this invention. Narrow bandpass filtering in association with the processor means or unit in the receiver, is then contemplated.

Finally, note that in order to evaluate the 4 wind phenomenon, namely that confined to vertical air motion, our beam geometry should be confined to a vertical plane and the common volume should include the glidepath.

A down draft of 10 m/sec would then lead to a Doppler shift of 73 Hz on the 10 GHz carrier frequency and 0.02 Hz for the beat frequency at 3.3 Hz.

We claim:

1. A system for detecting and measuring atmospheric air movement conditions such as wind velocity vectors, clear air turbulence and aircraft-induced vortices and turbulence, comprising:

a transmitter for irradiating a selected volume of air with a coherent electromagnetic energy beam in the microwave frequency range;

at least one receiver, positioned at a location separated from said transmitter by a preselected distance, for receiving and coherently demodulating a scattered electromagnetic energy beam resulting from scattering of said coherent electromagnetic energy beam in said selected volume of air to develop a demodulated signal, wherein said transmitter and at least one receiver each comprise a local oscillator locked to a common reference which is independent of said irradiated electromagnetic energy beam; and processor means for processing said demodulated signal from said at least one receiver and deriving quantitative information on said atmospheric air movement conditions therefrom;

wherein antennas of said transmitter and said at least one receiver are directed such that a scattering angle θ of said scattered electromagnetic energy beam is small enough for said scattered electromagnetic energy beam to have a higher power than noise sources in the system.

2. A system according to claim 1, wherein said scattering angle θ is smaller than 20°.

3. A system according to claim 1, wherein at least one of the transmitter and receiver antennas are arranged such that radiated power in the direction of the other of said antennas is suppressed to reduce direct leakage of electromagnetic energy between said transmitter and said at least one receiver.

4. A system according to claim 1 or claim 3, wherein at least one of said transmitter and receiver antennas are adapted to be steered to provide a two- or three-dimensional map of said atmospheric conditions, and in particular of windshear conditions.

5. A system according to claim 1, wherein said transmitter and at least one receiver each comprise a local oscillator locked to a GPS signal as to a common reference.

6. A system according to claim 1, wherein said transmitter comprises means for transmitting at least two coherently related microwave frequencies.

7. A system according to claim 6, wherein said transmitter comprises spatially separated antennas for transmitting said coherently related microwave frequencies.

8. A system according to claim 6, wherein said transmitter comprises a single antenna for transmitting said coherent related microwave frequencies.

9. A system according to claim 6, wherein said processor means comprises narrow bandpass filter means for forming two receiver channels for said two transmitted frequencies.

10. A system according to claim 6, wherein said at least one receiver has a separate receiving aperture and separate bandpass filter for each transmitted frequency, and said processor means comprises a signal processor for multiplying a homodyned signal from said at least one receiver at each transmitted frequency to generate a time series signal having a spectrum which gives the directional Doppler shift of said scattered energy beam in any plane through said selected volume of air.

11. A system according to claim 10, wherein said at least one receiver comprises a coherent homodyne demodulator for each transmitted frequency that gives a directional Doppler shift.

12. A system according to claim 10, wherein said at least one receiver comprises a plurality of receiving apertures and a coherent homodyne demodulator for each aperture.

13. A system according to claim 1, wherein said processor means comprises means for performing Delta-K processing to achieve one-, two- or three-dimensional wave number representation of a scattering distribution in said selected volume of air.

14. A system according to claim 1, wherein said processor means comprises means for generating a visual image of said atmospheric conditions through use of an inversion algorithm.

15. A method for detecting and measuring atmospheric air movement conditions such as wind velocity vectors, clear air turbulence and aircraft-induced vortices and turbulence, comprising the steps of:

irradiating from a transmission location a selected volume of air with a coherent electromagnetic energy beam in the microwave frequency range;

receiving and coherently demodulating at a location separated from said transmission location by a preselected distance, a scattered electromagnetic energy beam resulting from scattering of said coherent electromagnetic energy beam in said selected volume of air to develop a demodulated signal, said demodulating being performed with reference to a common reference independent of said coherent electromagnetic energy beam; and processing said demodulated signal and deriving quantitative information on said atmospheric air movement conditions therefrom;

wherein a scattering angle $\theta$ of said scattered electromagnetic energy beam is chosen to be small enough for said scattered electromagnetic energy beam to have a higher power than noise sources in the system.

* * * * *